United States Patent Office 3,341,529
Patented Sept. 12, 1967

3,341,529
**METHOD FOR PREPARING 2-STYRYLNAPH-
THOXAZOLE COMPOUNDS**
Bennett George Buell, Somerville, N.J., assignor to American Cyanamid Company, Stamford, Conn., a corporation of Maine
No Drawing. Filed Sept. 10, 1964, Ser. No. 395,584
15 Claims. (Cl. 260—240)

This invention relates to and has for its object the provision of an improved method for the preparation of 2-styrylnaphthoxazole compounds wherein an anil formed from cinnamaldehyde and an ortho aminonaphthol compound is subjected to oxidative ring closure conditions using nitrous acid as the ring closure reagent. The ring closure reaction is represented by the following typical equation where the ortho aminonaphthol is 1-amino-2-naphthol.

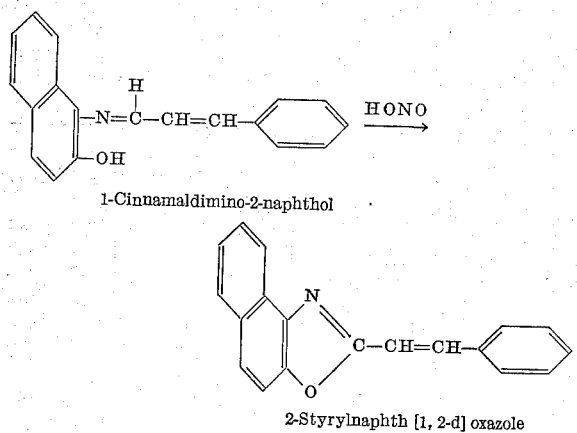

1-Cinnamaldimino-2-naphthol

2-Styrylnaphth [1, 2-d] oxazole

Similarly, 2-styrylnaphth[2,3-d]oxazole and 2-styrylnaphth[2,1-d]oxazole can be prepared by ring closure of the anils formed from cinnamic aldehyde and 2-amino-3-naphthol and 2-amino-1-naphthol, respectively.

The 2-styrylnaphthoxazoles provided by the process of the invention are useful as optical bleaching agents or brighteners for a variety of textile materials, both natural and synthetic, such as cotton, wool, silk, nylon, polyesters, etc. They also effectively brighten a variety of synthetic plastic materials whether woven or solid such as polyacrylates, polyvinyl halides, and the like. Their utility for this purpose is fully disclosed in copending applications, S.N. 317,809, filed Oct. 21, 1963 and S.N. 373,094, filed June 5, 1964, both now abandoned.

Although the ring closure reaction of o-hydroxy anil compounds to oxazoles is a known reaction, it has never been applied to the preparation of 2-styrylnaphthoxazoles. In addition, a particular feature of the present invention is the use of nitrous acid as the oxidizing agent in the oxidative ring closure process. Thus, while various types of oxidizing agents have been used in the past to effect such a ring closure, it has now been found that nitrous acid may be used to advantage over oxidizing agents which have been used heretofore. Thus, using nitrous acid, (generated in acetic acid by the addition of sodium nitrite), the by-products are gaseous and there are no objectionable metallic residues to contend with as is the case when metallic oxidizing agents derived from heavy metals are used, such as lead tetraacetate, potassium permanganate, cupric acetate, etc. With other conventional oxidizing agents, such as sodium hypochlorite, although ring closure is attained, chlorination takes place. Likewise, with peracetic acid in acetic acid, using the anil hydrochloride, considerable chlorination occurs. With nitrous acid, however, these disadvantages are avoided and a product of high purity is obtained by conventional means, such as recrystallization or chromatography.

An important advantage of the process of the invention is that the acetic acid functions therein both as solvent and reagent for the generation of the nitrous acid. Due to the insufficient solubility of the anil reactant in water, the use of glacial acetic acid is preferred. However, the presence of water in amounts which do not adversely affect solution of the anil is not precluded. As will be shown in the examples below, the 2-styrylnaphthoxazole product is precipitated from the reaction mixture by the addition of excess water.

Although acetic acid is preferred as solvent, the process of the invention can be successfully conducted employing other solvents which are water-miscible, such as methanol, ethanol, propanol, ethylene glycol, monoethylether of ethylene glycol, etc.

An added advantage of the use of nitrous acid is that the anil hydrochloride may be used directly (i.e., rather than first converting it to the free base). In fact, where the anil hydrochloride is used (with one of the aforesaid water-miscible solvents) the nitrous acid may be generated in situ from the reaction of the sodium nitrite with the hydrogen chloride of the anil so that the presence of acetic acid is not required. Finally, an important practical feature of the use of nitrous acid is its relatively low cost as compared to other oxidizing agents.

The invention is further illustrated by the examples which follow.

EXAMPLE 1

(A) *Formation of anil from 1-amino-2-naphthol and cinnamaldehyde*

To a solution of 6.6 g. of cinnamaldehyde in 100 ml. ethyl alcohol and 5 ml. of concentrated hydrochloric acid there was added 9.8 g. of 1-amino-2-naphthol hydrochloride. The mixture was heated at the reflux temperature two hours and after cooling, the solid material was removed by filtration, washed with ethanol and dried. The 13.7 g. of product thus obtained melted at 202–203° C. Analysis and infra-red examination confirmed the identity of the product as the anil hydrochloride.

(B) *Preparation of 2-styrylnaphthoxazole*

To a solution of 3.1 g. of the anil hydrochloride from A (above) in 50 ml. of glacial acetic acid there was added 0.7 g. of sodium nitrite. After stirring at room temperature for a brief period as nitrogen gases were given off, the mixture was heated gently on a steam bath (80–90° C.) for 15 minutes and then drowned in 500 ml. cold water. After addition of 200 ml. ethanol, and a small amount of dilute hydrochloric acid, and warming, the oily material which precipitated soon solidified. The solid was isolated by filtration, washed with water and dried. The 2.36 g. of solid product, M.P.=118–123° C., represented a yield of 80% of theoretical. The product showed the characteristic ultraviolet spectrum and blue fluorescence of 2-styrylnaphth[1,2-d]oxazole.

EXAMPLE 2

To 9.18 g. of the anil prepared in Example 1(A) in 100 ml. of glacial acetic acid there was added 2.2 g. of sodium nitrite. After stirring the mixture at room temperature for 20 minutes, an additional 0.2 g. sodium nitrite was added. After further stirring, 100 ml. water was added. After brief heating on the steam bath and cooling, the congealed solid material was isolated by filtration, washed and dried. 6.85 g. of solid product (M.P. 121–127° C.) representing a yield of 85% of theoretical was thus obtained. After recrystallization from ethanol, the material melted at 123.5–125° C. After being then chromatographed on an alumina column from chloroform solution and eluted with CHCl₃, the material melted at 124–126° C.

As seen from the examples, the process of the invention affords high yields (80–85%) of 2-styrylnaphthoxazole.

Where acetic acid is employed as the solvent for the reaction, the amount thereof is not critical, except that it should be sufficient to provide easy stirring of the reaction mixture. This, of course, applies to the other solvents also. Where, on the other hand, acetic acid is employed as reagent (to form the nitrous acid by reaction with sodium nitrite), the amount should be sufficient to provide about 1 mole proportion of nitrous acid per mole of the anil reactant. Correspondingly, the amount of sodium nitrite used should be sufficient to provide the necessary nitrous acid for the reaction. Generally, a small excess over about 1 mole thereof per mole of anil is satisfactory.

As has been indicated previously, where the anil reactant is in the form of the hydrochloride salt thereof and the solvent is other than acetic acid, the necessary nitrous acid is supplied from the reaction of the sodium nitrite and the hydrogen chloride of the anil, so that no acetic acid need be used.

As illustrated in the examples, the 2-styrylnaphthoxazole product is precipitated from the reaction mixture by addition of water. Generally, a relatively large excess of water is used for this purpose. A generally suitable procedure is to simply pour the reaction mixture into a relatively large volume of ice water. With solvents other than acetic acid, however, it is sometimes necessary to add the water to the reaction mixture in a controlled fashion, i.e., portionwise in order to avoid oiling out of the product.

It has been found that the anil ring closure method of this invention is applicable to the anils derived from cinnamaldehyde and certain substituted ortho aminonaphthols. Thus, although not successful in all instances in which it was tried, it was found to be successful with the anils derived from cinnamaldehyde and the following aminonaphthols: 1 - amino-2 - naphthol-3 - carbanilide, 1-amino-2-naphthol-4-sulfonic acid and 1-amino-2-naphthol-3-carboxylic acid.

Although the present invention has been described and illustrated herein in terms of specific embodiments and examples thereof, it is not intended that the scope of the invention be limited in any way thereby, but only as indicated in the following claims.

I claim:

1. A method for preparing a 2-styrylnaphthoxazole compound which comprises reacting the anil formed from cinnamaldehyde and an ortho aminonaphthol compound selected from the group consisting of 1-amino-2-naphthol, 3-amino-2-naphthol, 2-amino-1-naphthol, 1-amino-2-naphthol-3-carbanilide, 1-amino-2-naphthol - 4 - sulfonic acid, and 1-amino-2-naphthol-3-carboxylic acid with nitrous acid in a water-miscible solvent, introducing water to the reaction mixture to precipitate the 2-styrylnaphthoxazole product and isolating said product.

2. The process of claim 1 wherein the ortho aminonaphthol compound is 1-amino-2-naphthol.

3. The process of claim 1 wherein the ortho aminonaphthol compound is 3-amino-2-naphthol.

4. The process of claim 1 wherein the ortho aminonaphthol compound is 2-amino-1-naphthol.

5. The process of claim 1 wherein the aminonaphthol compound is 1-amino-2-naphthol-3-carbanilide.

6. The process of claim 1 wherein the ortho aminonaphthol compound is 1-amino-2-naphthol-4-sulfonic acid.

7. The process of claim 1 wherein the ortho aminonaphthol compound is 1-amino-2-naphthol-3-carboxylic acid.

8. The method of claim 1 wherein the solvent is acetic acid and the nitrous acid is generated by addition of sodium nitrite to the acetic acid solution of the anil.

9. The method of claim 1 wherein the solvent is other than acetic acid and the nitrous acid is generated by the addition of acetic acid and sodium nitrite to the solvent solution of the anil.

10. The process of claim 9 wherein the solvent is ethanol.

11. The process of claim 9 wherein the solvent is the monoethylether of ethylene glycol.

12. The method of claim 1 wherein the anil is in the form of the hydrogen chloride salt thereof, the solvent is other than acetic acid and the nitrous acid is generated by the addition of sodium nitrite to the solvent solution of the anil.

13. The process of claim 12 wherein the solvent is ethanol.

14. The process of claim 12 wherein the solvent is the monoethylether of ethylene glycol.

15. A method of the preparation of 2-styrylnaphth[1,2-d]oxazole which comprises forming a solution of the anil formed from cinnamaldehyde and 1-amino-2-naphthol in acetic acid, adding sodium nitrite to said solution, maintaining said solution at a temperature of about 25° C. to about 100° C. for a time to effect reaction, introducing water to said solution to precipitate the 2-styrylnaphth[1,2-d]oxazole product therefrom and isolating said product.

References Cited

FOREIGN PATENTS 669,402   4/1952   Great Britain.

OTHER REFERENCES

Elderfield, Heterocyclic Compounds, volume 5, pp. 429–431, John Wiley and Sons, Inc., New York (1957).

Elsevier's Encyclopedia of Organic Chemistry, Series III, volume 12B, pp. 1636 and 1665, Elsevier Pub. Co., Inc. New York (1950).

Moeller, Inorganic Chemistry, page 616, John Wiley and Sons, New York (1952).

Osman et al., J. Org. Chem., volume 27, pp. 558–561 (1962).

Stephens et al., J. Chem. Soc., 1949, pp. 2971–2972.

JOHN D. RANDOLPH, *Primary Examiner.*